(12) United States Patent
Hiraka

(10) Patent No.: US 7,536,109 B2
(45) Date of Patent: May 19, 2009

(54) OPTICAL NETWORK SYSTEM AND DEVICE, AND METHOD FOR CONTROLLING OPTICAL NETWORK AND DEVICE

(75) Inventor: Seiji Hiraka, Miyagi (JP)

(73) Assignee: Tokyo Electron Device Limited, Yokohama (JP)

( * ) Notice: Subject to any disclaimer, the term of this patent is extended or adjusted under 35 U.S.C. 154(b) by 507 days.

(21) Appl. No.: 11/506,050

(22) Filed: Aug. 16, 2006

(65) Prior Publication Data
US 2007/0104486 A1    May 10, 2007

(30) Foreign Application Priority Data
Aug. 16, 2005  (JP) ............................. 2005-236093

(51) Int. Cl.
*H04B 10/00* (2006.01)
(52) U.S. Cl. ................. 398/167.5; 398/166; 398/154
(58) Field of Classification Search ................. 398/22, 398/25, 33, 43, 66, 67, 70, 135, 137, 141, 398/151, 154, 155, 158, 165, 166, 167.5
See application file for complete search history.

(56) References Cited

U.S. PATENT DOCUMENTS

| | | | | |
|---|---|---|---|---|
| 6,845,301 B2* | 1/2005 | Hamamatsu et al. | ........ | 700/292 |
| 6,961,312 B2* | 11/2005 | Kubler et al. | ................ | 370/238 |
| 2002/0114042 A1* | 8/2002 | Ichibangase et al. | ........ | 359/167 |
| 2002/0114043 A1* | 8/2002 | Kozaki et al. | ................ | 359/167 |
| 2003/0161637 A1* | 8/2003 | Yamamoto et al. | ....... | 398/167.5 |

FOREIGN PATENT DOCUMENTS

JP    H08-147229    6/1996

* cited by examiner

*Primary Examiner*—Dalzid Singh
(74) *Attorney, Agent, or Firm*—Mitchell P. Brook; Luce, Forward, Hamilton & Scripps

(57) ABSTRACT

When entering an idling state, a master unit M transmits an optical signal for polling addressed to each slave unit S-1 to S-n. The slave unit S-n located at the lowest rank of a direct chain constituted by S-1 to S-n, when receiving the optical signal for polling for the self unit, responds by transmitting an optical signal representing a phase correction request signal to the other slave units. The slave units S-1 to S-(n–1) respond to the phase correction request signal, and initialize each clock signal to synchronize with the clock signal of the slave unit S-n at the lowest rank.

20 Claims, 7 Drawing Sheets

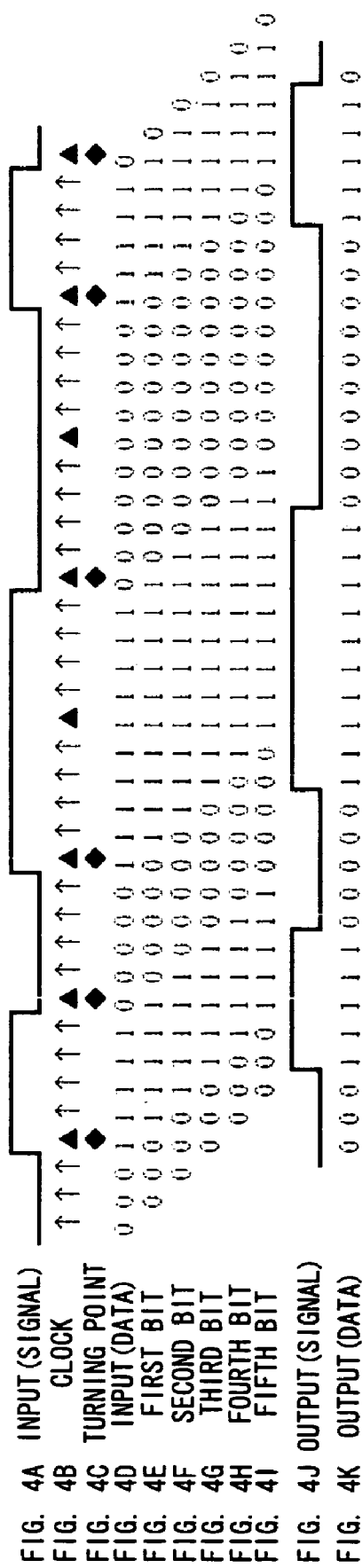

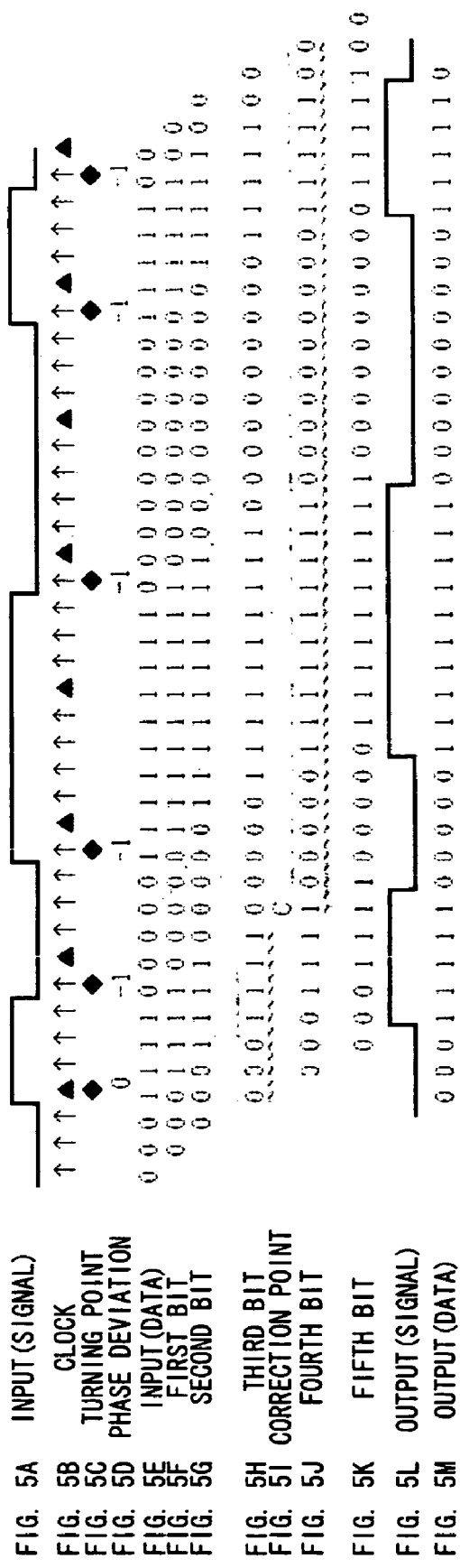

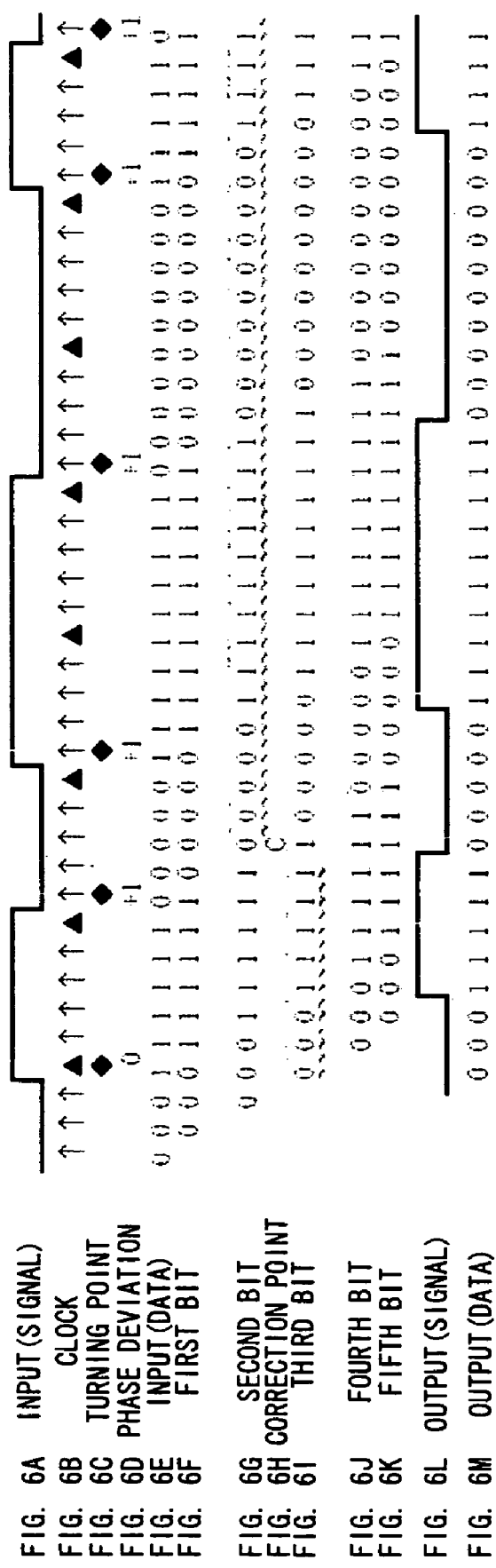

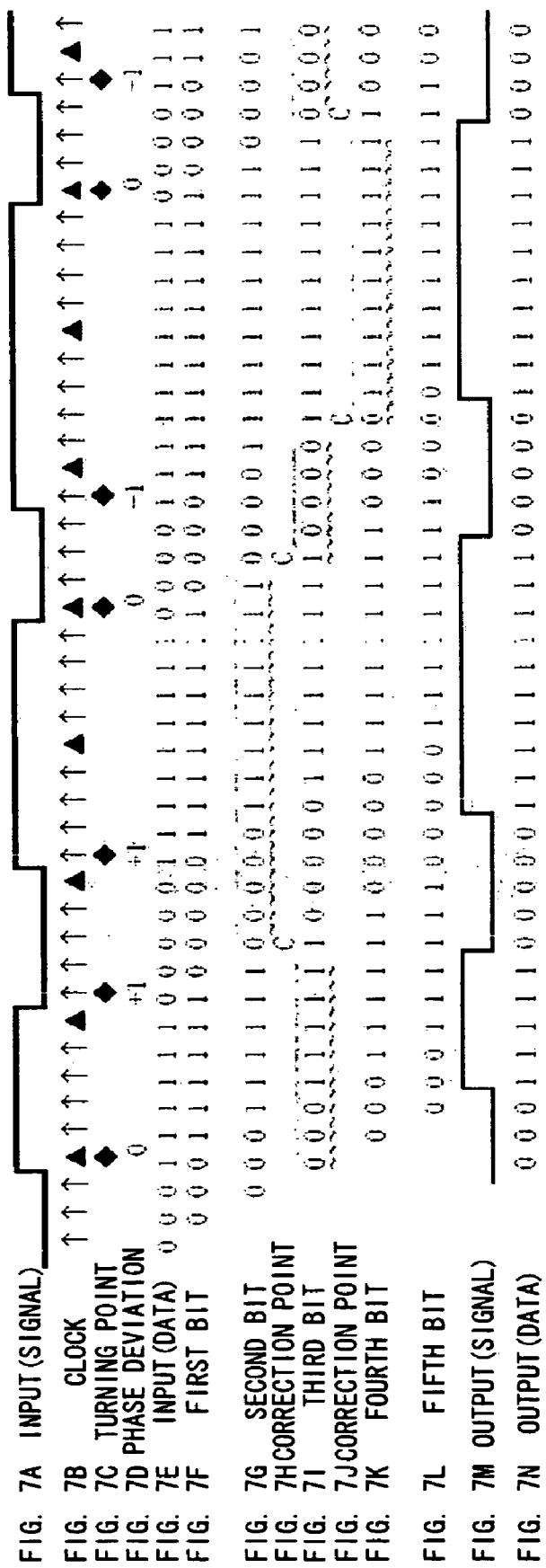

OPTICAL NETWORK SYSTEM AND DEVICE, AND METHOD FOR CONTROLLING OPTICAL NETWORK AND DEVICE

BACKGROUND OF THE INVENTION

1. Field of the Invention

The present invention relates to an optical network system, optical network device and optical network control method to execute data communication through an optical network.

2. Description of the Related Art

Recently, data communication through an optical network has been popularized with the purpose of remote control of electrical equipment. To execute data communication through an optical network between one piece of equipment as a master unit and multiple pieces of equipment as slave units, as published in Unexamined Japanese Patent Application KOKAI Publication No. H8-147229 for example, this equipment is interconnected in the shape of a so called multi-drop connection to execute data communication. The disclosure of the Unexamined Japanese Patent Application KOKAI publication No. H8-147229 is incorporated herein by reference in its entirety.

For this multi-drop connection, an order is previously given to the multiple pieces of equipment as slave units, and the master unit and the slave unit at the highest rank are first connected through an optical transmission line such as optical fiber. Next, the slave unit at the highest rank and that at the second highest rank are connected through an optical transmission line. Thereafter, down to the slave unit at the lowest rank, adjacent slave units are mutually connected through the optical transmission line, resulting in the formation of an optical network in the shape of a chain.

In an optical network in the form of a multi-drop connection, data communication is generally executed by a method called the polling system, whereby the master requests each slave to respond, and the slave returns the response. The data communication between the master and the slave is generally executed by synchronizing to a clock signal generated by the master and slave independently.

Actually, when transmitting data from the master to the slave, for example, the master transmits the data to the slave by synchronizing with the clock signal generated by the master itself. The slave latches the data transmitted by the master in synchronization with the clock signal generated by the relative slave itself for receiving the data. When the slave transmits data to the master, the slave transmits the data to the master in synchronization with the clock signal generated by the slave itself. The master latches the data transmitted by the slave in synchronization with the clock signal generated by the master itself for receiving the data.

Similarly, data communication between multiple slaves may be mutually executed. In practice, when the data received by the first slave from the master is addressed to the second slave, for example, the first slave transmits the data to the second slave in synchronization with the clock signal generated by the first slave itself. Further, the second slave latches the data transmitted by the first slave in synchronization with the clock signal generated by the second slave itself to receive the data.

However, when the transmission of a pulse representing data is executed in synchronization with the clock, there will be a problem with the deviation of time length or phase of the pulse, as the pulse is latched under an unstable state of pulse transition or the like. Assuming that the time length of the pulse constituting the clock signal generated by the master is "1", when a pulse with a time length of "5" is transmitted from the master to the slave, a situation could arise, in which for example, the time length of this pulse transmitted at the time of receiving by the slave may become a time of "4" or "6", or the phase may deviate for one clock cycle.

As a method to solve such a problem, it has been considered to reduce the fluctuation of the time length of pulses representing data, or that of percentage phases by making the time length of pulses representing data sufficiently longer than the time length of pulses constituting the clock signal.

Another method includes the slave receiving a pulse storing the data sampled in the cycle of clock signal into the stack of FIFO (first-in, first-out) type, and reproducing the pulse by reading the data from the stack. When the time length of a pulse unexpectedly takes a longer or shorter time length, (although the time length of a pulse should be an integer multiple of five in a clock cycle, when another value is employed, for example), deviating the reading position from the stack may reproduce a pulse in which the time length was corrected (the pulse of an integer multiple of five in a clock cycle having the time length closest to that before correction, for example). When the reproduced pulse is supposed be transmitted to the yet succeeding slave, the slave reproducing the pulse transmits the pulse to the relative succeeding slave.

Despite of employing the above mentioned method using a stack, however, a problem with the deviation of the time length or phase of a pulse has been generated due to the jitter of the clock signal or fluctuation of frequency. In addition, making the time length of a pulse representing data as long as possible to withstand practical use has not been successful in removing the effect of the deviation of the time length or phase of a pulse.

SUMMARY OF THE INVENTION

The present invention has been achieved based on practical situations as mentioned above, and the object of the present invention is to provide an optical network system, an optical network device, an optical network control method, and an optical network device control method with a small deviation in the width (time length) and/or the phase of pulse of the transmitting signal.

Another object of the present invention is to suppress deviation in width (time length) and/or the phase of pulse of the transmitting signal.

To achieve the object, the optical network system of the present invention comprises:

a master unit that executes the transmitting and receiving of optical signals between itself and other devices through an optical transmission line; and slave units each of which executes the transmitting and receiving of optical signals between itself and other devices through an optical transmission line;

wherein the slave units, from the slave unit at highest rank to the slave unit at lowest rank, are interconnected in the form of a direct chain configuration through an optical transmission line;

the master unit is connected to the slave unit at the highest rank through an optical transmission line, and executes the transmitting and receiving of optical signals between itself and the slave unit of the highest rank through the optical transmission line, and between itself and the slave unit except the slave unit of the highest rank through other slave unit and the optical transmission line located between the slave unit and itself;

the master unit determines whether or not a period during which a specified action is not requested to itself has been continued for a certain period of time or longer; and when determined as having been continued, transmits an optical signal for polling including a code requiring a predetermined response to the slave unit at the lowest rank;

each of the slave units receives optical signal transmitted thereto through the optical transmission line, generates a clock signal, latches a value represented by the optical signal received in response to the clock signal; and generates an optical signal representing latched value;

the slave unit at the lowest rank receives the optical signal for polling including the code, transmits the predetermined response to other slave units through the optical transmission line, the predetermined response requesting initialization of clock signals of the other slave units; and the slave units other than the slave unit at the lowest rank receives the predetermined response, and initialize the clock signals of themselves so as to synchronize with the clock signal generated by the slave unit at the lowest rank.

To achieve the object the optical network device that executes the transmitting and receiving of optical signals externally through an optical transmission line, comprises:

a clock signal generating section which generates clock signals; and a transmitting and receiving section which receives optical signals externally, latches a value represented by the optical signal in response to the clock signal, and generates and transmits the optical signal representing latched value;

wherein the transmitting and receiving section includes:

a determining section which determines, when an optical signal for polling including a code requesting a predetermined response, which is addressed to lowest rank optical network device among multiple optical network devices interconnected mutually through an optical transmission line from highest rank to lowest rank, is received, whether or not the optical signal for polling is addressed to itself; and a transmitting section for transmitting, when the determining section determines that the optical signal for polling including the code is addressed thereto, an optical signal representing a correction request requesting at least one external optical network device to initialize a clock signal of the at least one external optical network device to synchronize it with a clock signal generated by the clock generating section thereof.

The transmitting and receiving section may comprise, for example, a section for initializing the clock signal generated by the clock signal generating section to synchronize it with the clock signal generated by an external optical network device in response to the correction request upon receiving the optical signal representing the correction request.

The transmitting and receiving section may store, for example, latched values sequentially, select stored values sequentially, and generate optical signals representing the selected values; and the stored values may be selected so that the time length of the pulse constituting the optical signal to be generated is a value conforming to specified conditions; and the correction amount of the pulse length from the time length of the pulse constituting the optical signal received is minimized.

The achieve the object, the optical network control method for controlling an optical network system comprises: a master unit that executes the transmitting and receiving of optical signals between itself and other devices through an optical transmission line; and one or more slave units each of which executes the transmitting and receiving of optical signals between itself and other devices through an optical transmission line;

wherein the slave units, from the slave unit at the highest rank to the slave unit at the lowest rank are interconnected in the form of a direct chain configuration through an optical transmission line;

the master unit is connected to the slave unit at the highest rank through an optical transmission line, and executes the transmitting and receiving of optical signals between the slave units and itself through other slave units an optical transmission line located between itself and other slave units;

the master unit determines whether or not a period during which a specified action is not requested to itself has been continued for a certain time or longer; and when it is deemed as having been, transmits an optical signal for polling including a special code requiring a specified response to the slave unit at the lowest rank;

each of the slave units generates a clock signal, and latches a value represented by the optical signal received by itself at a timing to synchronize with the clock signal generated by itself; and generates an optical signal representing the latched value;

the slave unit at the lowest rank responds to a special code when it receives the optical signal for polling including the special code; and transmits an optical signal to the other slave units, the optical signal representing a correction request requesting the initialization of clock signals generated by the other slave units; and the slave units other than that at the lowest rank respond to the correction request when they receive the optical signal representing the correction request; and initialize clock signals generated by themselves to synchronize them with the clock signal generated by the slave unit at the lowest rank.

To achieve the object, the method for controlling an optical network device that executes the transmitting and receiving of optical signals externally through an optical transmission line, controls the optical network device to execute;

a clock signal generating step to generate clock signals; and a transmitting and receiving step to receive an optical signal externally, latch the value represented by the optical signal in synchronization with the clock signal, and generate and transmit the optical signal representing the latched value;

wherein the transmitting and receiving step comprises:

a determining step to determine, when an optical signal for polling including a code requesting a specified response, which is addressed to lowest rank network device among multiple optical network devices interconnected mutually through an optical transmission line from highest rank to lowest rank, is received, whether or not the optical signal for polling is addressed thereto; and a transmitting step to transmit, when the determining step determines that the optical signal for polling including the special code is addressed thereto, the specified response requesting an external optical network device to synchronize a clock signal of the external optical network device to a clock signal generated by the clock generating step.

The transmitting and receiving section may comprise a first transmission section for transmitting the optical signal to the optical network device at upper rank, a second transmission section for transmitting the optical signal to the optical network device at lower rank, a first receiving section for receiving optical signal from the optical network device at upper rank, and a second receiving section for receiving the optical signal from the optical network device at lower rank, resulting in mutual transmission in the optical network.

The master unit and each said slave units together comprise an optical network device that executes the transmitting and receiving of optical signals externally through an optical transmission line, comprising:

a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises:

a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;

further comprising first and second transmission sections and first and second receiving sections for the transmitting and receiving section;

wherein the second transmission section of the master unit is connected to the first receiving section of the slave unit at the highest rank; and wherein the first transmitting section of the slave unit at the highest rank is connected to the second receiving section of the master unit.

The master unit and each said slave units together may comprise an optical network device that executes the transmitting and receiving of optical signals externally through an optical transmission line, comprising: a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section may comprise: a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling. The transmitting and receiving section further comprises first and second transmission sections and first and second receiving sections for the transmitting and receiving section; and the second transmission section of $j^{th}$ slave unit is connected to the first receiving section of $(j+1)^{th}$ slave unit; and the first transmitting section of $(j+1)^{th}$ slave unit is connected to the second receiving section of $j^{th}$ slave unit.

The master unit, for example, comprises an optical network device that executes the transmitting and receiving of optical signals externally through an optical transmission line, comprising: a clock signal generating section for generating clock signals; and a transmitting and receiving section for receiving optical signals externally, latching a value represented by the optical signal in synchronization with the clock signal, and generating and transmitting the optical signal representing the latched value; wherein the transmitting and receiving section comprises: a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling; further comprising first and second transmission sections and first and second receiving sections for the transmitting and receiving section; wherein the first transmitting section and the first receiving section are not used but light-shielded; and the slave unit at the lowest rank is the optical network device, and the second transmitting section and the second receiving section are not used but light-shielded.

The master unit, for example, is connected to an external control device, and each slave unit is connected to an external to-be controlled device.

The master unit may be formed inside a chassis commonly used for the control device, or formed in a shape attachable to a slot equipped by the control device.

The slave unit, for example, is formed in a chassis used commonly with the to-be controlled device; or formed in a shape attachable to a slot equipped by the to-be controlled device.

The clock signal generating section may comprise a crystal oscillator and/or a logic circuit.

The optical network device comprises: a control section, wherein the control section is equipped with a processor including a CPU (Central Processing Unit), a volatile memory including a RAM (Random Access Memory), and a non-volatile memory including a hard disk device.

The master unit may comprise an optical network device that executes the transmitting and receiving of optical signals externally through an optical transmission line, and the optical network device comprise: a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises: a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;

wherein the determining section, which determines whether or not a period during which a specified action is not requested to itself has been continued for a certain period of time or longer, makes such a determination based on a clock signal supplied by the clock signal generating section.

The master unit may comprise an optical network device that executes the transmitting and receiving of optical signals externally through an optical transmission line. The optical network device comprises: a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises: a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling; the optical network device further comprising a control section, wherein the control section is equipped with a processor including a CPU (Central Processing Unit), a volatile memory including a RAM (Random Access Memory), and a non-volatile memory including a hard disk device, wherein the master unit is the optical network device; and the non-volatile memory of the control section of the master unit previously stores the data specifying the slave unit at the lowest rank; and the processor of the control section specifies the slave unit at the lowest rank by accessing this data.

The master unit and each said slave units together may comprise an optical network device that executes the transmitting and receiving of optical signals externally through an optical transmission line. The optical network device may comprises: a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises: a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling; further comprises first and second transmission sections and first and second receiving sections for the transmitting and receiving section;

wherein the first and second transmitting section of each slave unit have the same physical composition as that of the first and second transmitting section of the master unit; and wherein the first and second receiving section of each slave unit have the same physical composition as that of the first and second receiving sections of the master unit.

The master unit and each said slave units together comprise an optical network device that executes the transmitting and receiving of optical signals externally through an optical transmission line. The optical network device may comprise: a clock signal generating section for generating clock signals; and a transmitting and receiving section for receiving optical signals externally, latching a value represented by the optical signal in synchronization with the clock signal, and generating and transmitting the optical signal representing the latched value. In this case, the transmitting and receiving section may comprise: a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling. The optical network device may further comprise a control section, wherein the control section is equipped with a processor having CPU (Central Processing Unit), a volatile memory including RAM (Random Access Memory) and non-volatile memory including a hard disk device, and the control section of each slave unit has the same physical composition as that of the control section of the master unit.

The processor of the control section may read the program stored in the non-volatile memory of the control section, and execute this program using the clock signal supplied by the clock generating section as an operating clock.

BRIEF DESCRIPTION OF THE DRAWINGS

These objects and other objects and advantages of the present invention will become more apparent upon reading of the following detailed description and the accompanying drawings in which:

FIGS. 4A to 4K show an example of the time transition of values stored in stacks of master and slave units when the original pulse time length (width) is normal, and the pulse wave shape after correction;

FIGS. 5A to 5M show an example of the time transition of values stored in the stacks when the original pulse time length is shorter than normal, and the pulse wave shape after correction;

FIGS. 6A to 6M show an example of the time transition of values stored in the stacks when the original pulse time length is longer than normal, and the pulse wave shape after correction; and FIGS. 7A to 7N show an example in which change in phase deviation of an input signal occurs multiple times.

DETAILED DESCRIPTION OF THE PREFERRED EMBODIMENTS

Figure 1:
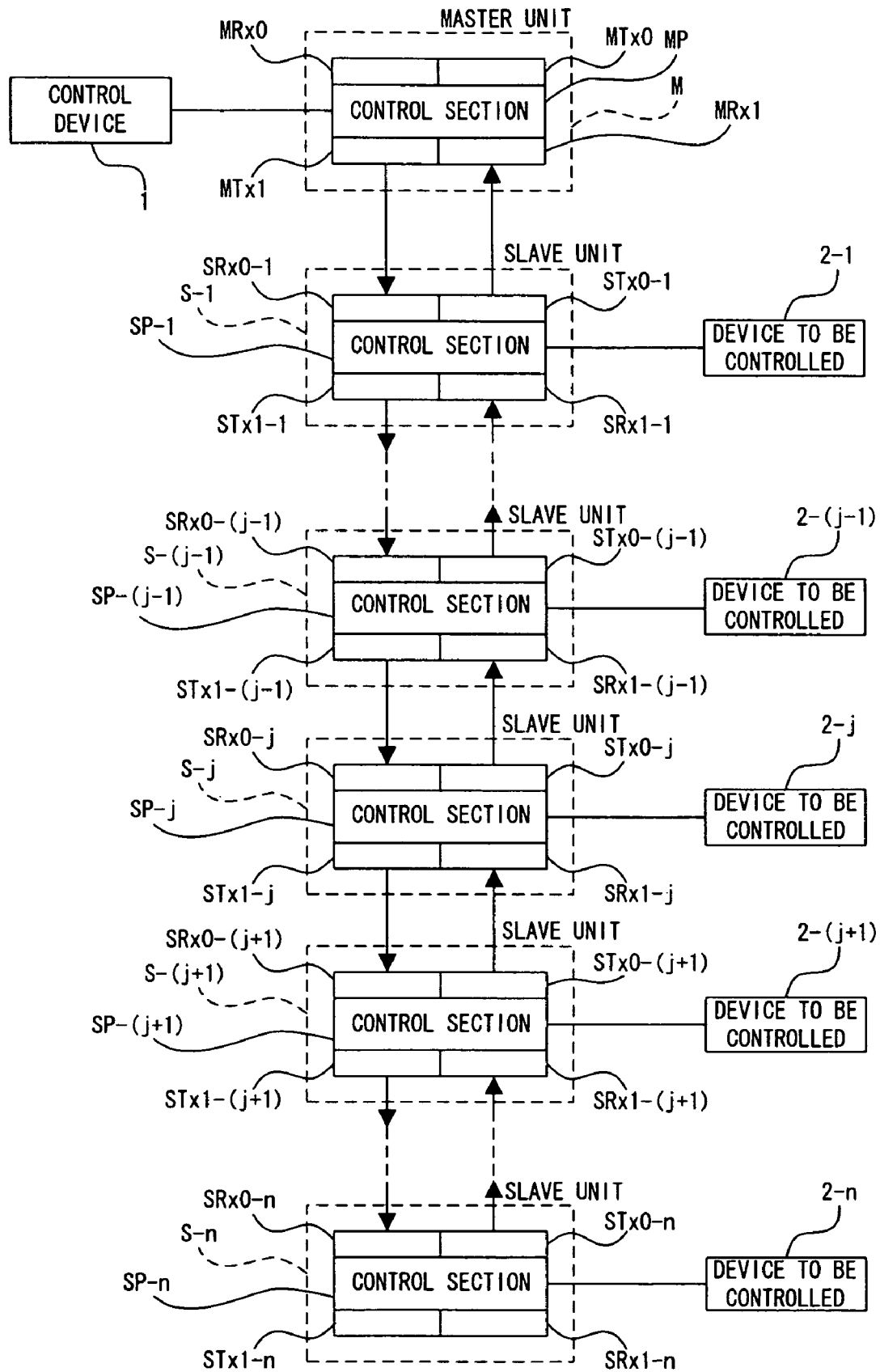
FIG. 1 is a block diagram showing the structure of an optical network system relating to the embodiment of the present invention.

An embodiment of the present invention is explained below taking an optical network system as an example and referring to the drawings.

As shown in FIG. 1, this optical network system comprises a master unit M and slave units S-1 to S-n of n-pieces (n represents an integer greater than 1).

Figure 2:
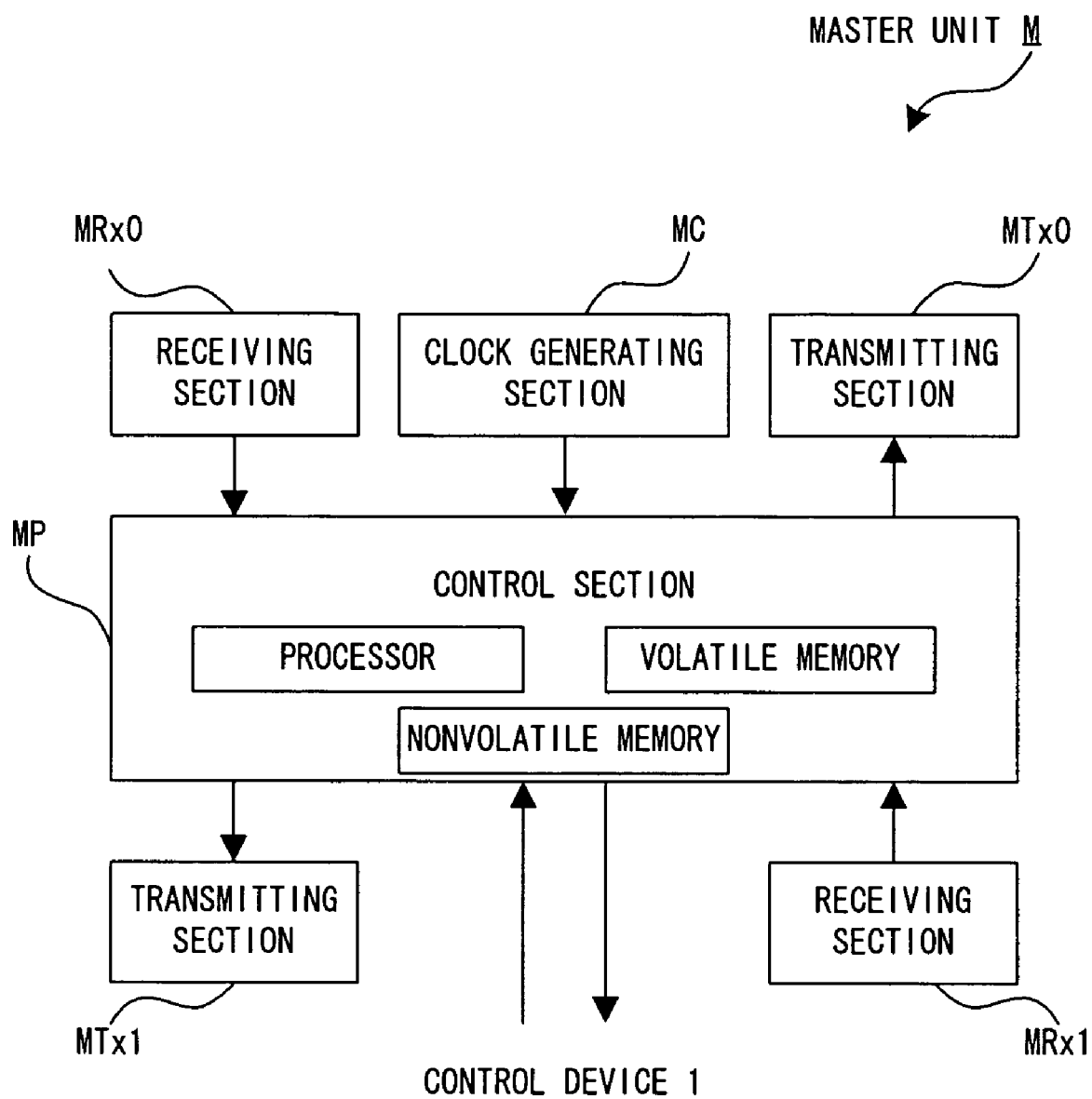
FIG. 2 shows the structure of the master unit.

The master unit M comprises a control section MP, a clock generating section MC, transmitting sections MTx0 and MTx1, and receiving sections MRx0 and MRx1, as shown in FIG. 2. The clock generating section MC, transmitting sections MTx0 and MTx1, and receiving section MRx0 and MRx1 are connected to the control section MP electrically.

Figure 3:
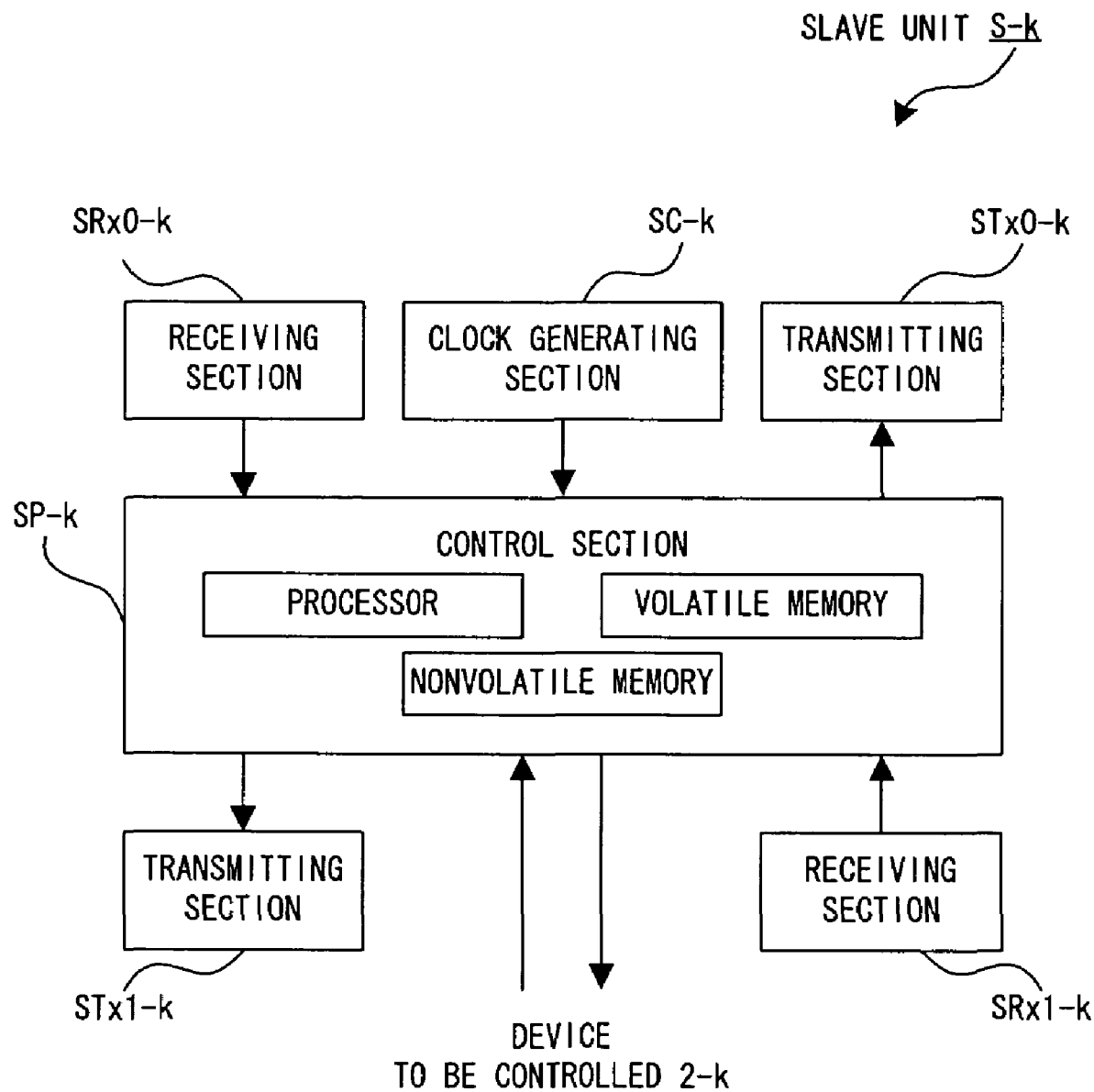
FIG. 3 shows the structure of the slave unit.

The slave units S-1 to S-n have substantially the same structure and functions with each other. The slave unit S-k (k represents an integer equal to or greater than 1, and equal to or less than n) comprises a control section SP-k, a clock generating section SC-k, transmitting sections STx0-k, and STx1-k, and receiving sections SRx0-k, and SRx1-k as shown in FIG. 3. The clock generating section SC-k, the transmitting sections STx0-k, and STx1-k, and receiving sections SRx0-k, and SRx1-k are connected to the control section SP-k electrically.

The transmitting section MTx1 of the master unit M is connected to the receiving section SRx0-1 of the slave unit S-1 as shown in FIG. 1. The transmitting section STx0-1 of the slave unit S-1 is connected to the receiving section MRx1 of the master unit M.

The transmitting section STx1-j of the slave unit S-j (j represents an integer equal to or greater than 1, and less than n) is connected to the receiving section SRx0-(j+1) of the slave unit S-(j+1) as shown in FIG. 1. The transmitting section STx0-(j+1) of the slave unit S-(j+1) is connected to the receiving section SRx1-j of the slave unit S-j.

The transmitting section MTx0 and the receiving section MRx0 of the master unit M are not used in this embodiment, and are, for example, respectively light-shielded. The transmitting section STx1-n and the receiving section SRx1-n of the slave units S-n are not used either in this embodiment, and are, for example, respectively light-shielded.

The control section MP is further connected to an external control device 1 as shown in FIGS. 1 and 2. The control device 1 is a device to control the devices to be controlled 2-1 to 2-n, to be explained later, and connected to the slave units S-1 to S-n through the master unit M by exchanging electrical signals between the control section MP.

As shown in FIGS. 1 and 3, a control section SP-k is connected to an external device to be controlled 2-k. The device to be controlled 2-k, by exchanging electric signal between the control section SP-k, is controlled from the control device 1 through the master unit M and the slave units S-1 to S-k to act following this control.

The master unit M may be formed in a common chassis with the control device 1, for example, or may be formed in a shape attachable to a slot equipped by the control device 1. The control device 1 may also have the function of the control section MP.

The slave unit S-k may be formed in a common chassis with the device to be controlled 2-k for example, or may be formed in a shape attachable to a slot equipped by the device to be controlled 2-k. The device to be controlled 2-k may also have the function of the control section SP-k.

The following is an explanation of each section of the master unit M and slave unit S-k. The transmitting sections MTx0 and MTx1 of the master unit M have substantially the same physical structure. The transmitting sections MTx0 and MTx1 have a light emitting element such as a light emitting diode or laser diode and emit light with an intensity corresponding to logical values of the electric signal supplied by the control section MP.

The receiving sections MRx0 and MRx1 have substantially the same physical composition. The receiving sections MRx0 and MRx1 have light receiving elements like photo-transistors, generate electrical signals representing the light intensity of light received, and supply them to the control section MP.

The clock generating section MC comprises, for example, by a crystal oscillator and/or logic circuits, generates a clock signal with a specified frequency, and supplies it to the control section MP continuously.

The control section MP has a processor and a memory. The processor comprises a CPU (Central Processing Unit), etc. The memory includes a volatile memory such as a RAM (Random Access Memory), etc., and a non-volatile memory such as a hard disk device, a flash-memory device etc. The non-volatile memory of the control section MP has previously stored a program to control the processing, described later, to be done by the processor of the control section MP, and the processor of the control section MP reads the program and executes the program using the clock signal supplied by the clock generating section MC as an operating clock. The volatile memory of the control section MP provides a work area of the processor of the control section MP.

The processor of the control section MP is connected to the control device 1. The processor of the control section MP mediates the control of the devices to be controlled 2-1 to 2-n by the control device 1, by performing a process, such as a process to generate optical signals by making the transmitting section MTx1 emit light following the electric signal for control supplied by the control device 1, a process to generate electrical signals to be supplied to the control device 1 based on the electrical signals by gaining the electrical signals supplied by the receiving section MRx1 to supply to the control device 1, or a process to supply the electrical signal being supplied by the receiving section MRx1 to the control device 1 as it is.

The processor of the control section MP, when the master unit M enters an idling state (namely a state when the signal has not been supplied from the control device 1 or slave unit S-1 for a certain period, or it itself has not been requested to engage in a specified action), it generates an optical signal for polling in the transmitting section MTx1 (namely, for the process to request a specified response addressed to the slave unit). However, the optical signal for polling addressed to the slave unit S-n at the lowest rank should have a section to express the special code requesting the slave unit S-n at the lowest rank to generate optical signals to express the phase correction request signal.

The processor of the control section MP is simply requested, based on, for example, the clock signal supplied by the clock generating section MC, to check the record of processing in a certain period, if it existed.

To specify the slave unit at the lowest rank S-n by the processor of the control section MP, any method may be applied. Therefore, the execution of the method disclosed in Unexamined Japanese Patent Application KOKAI publication No. 2006-129235 may specify the slave unit at the lowest rank S-n. Or, the slave unit at the lowest rank may be specified by previously storing the data specifying the slave unit S-n at the lowest rank in the non-volatile memory and accessing the data by the processor of the control section MP as required. The disclosure of the Unexamined Japanese Patent Application KOKAI publication No. 2006-129235 is incorporated herein by reference in its entirety.

On the other hand, the transmitting sections STx0-k and STx1-k of the slave unit S-k both have substantially the same physical composition as the receiving sections MTx0 and MTx1 of the master unit M, for example, and generate light with an intensity in accordance with the signal supplied by the control section SP-k.

The receiving sections SRx0-k and SRx1-k have substantially the same physical composition as the receiving sections MRx0 or MRx1 of the master unit M, for example, and generate an electrical signal to express the intensity of the light received and supply it to the control section SP-k.

The clock generating section SC-k comprises a crystal oscillator and/or logic circuits such as a phase locked loop (PLL) circuit, and generates a clock with the same frequency as that generated by the clock generating section MC of the master unit M and supplies it to the control section SP-k continuously.

The clock generating section SC-k, when the slave unit S-k for which it itself belongs to is not the slave unit S-n and the specified initialization command given from the control section SP-k of the slave unit S-k for which it itself belongs to is supplied to itself, has a functionality to initialize synchronization of the phase of the clock signal generated by itself to the clock signal generated by the clock generating section SC-n of the slave unit S-n at the lowest rank. Practically, the clock generating section SC-k, when the processor of the control section SP-k supplies initialization commands in response to the phase correction request supplied by the slave unit S-n at the lowest rank, for example, synchronizes the clock signal generated by itself to the optical signal in response to the initialization command.

As stated later, the general optical signals to be generated by a slave unit are generated in a form to synchronize the clock signals generated by the clock generating section of the slave unit. Accordingly, optical signals including a phase correction request signal are generated to synchronize the clock signal generated by the self clock generating section SC-n by the slave unit S-n at the lowest rank. For this reason, the clock generating section SC-k synchronizes the clock signal generated by itself to the optical signal including a phase correction request signal. As a result, the phase of the clock signal is synchronized to the phase of the clock signal generated by the clock generating section SC-n of the slave unit S-n at the lowest rank. In this case, the delivery of the clock signal from the slave unit S-n at the lowest rank to the other slave units is not necessary.

The control section SP-k has the same physical composition as that of the control section MP of the master unit M substantially, for example, and the processor of the control section SP-k is connected to the device to be controlled 2-k. The storage area of the volatile memory of the control section SP-k is used for the work area of the processor of the control section SP-k, and in addition, it forms the first and second stack areas.

The processor of the control section SP-k reads the program being stored in the non-volatile memory of the control section SP-k, and executes this program using the clock signal supplied by the clock generating section SC-k as an operating clock. Under the control of this program, processing is provided to generate optical signals synchronized with the clock signals by emitting light on the transmitting section STx0-k according to the electrical signals for control supplied by the device to be controlled 2-k.

Under the control of this program, the processor of the control section SP-k gains electrical signals supplied by the receiving section SRx0-k, and latches a value indicated by the electrical signals at a specified timing based on the clock signals generated by the clock generating section SC-k (at the timing of start-up of the clock signal, for example). Then, based on the latched value, for example, processing is provided to distinguish whether the optical signal received by the receiving section SRx0-k is a signal to control the device to be controlled 2-k or that for polling addressed to the slave unit S-k, or that belonging to neither.

When a signal is deemed as being for the purpose of controlling the device to be controlled 2-k, the processor of the control section SP-k processes to generate electrical signals to supply to the device to be controlled 2-k based on the electrical signal acquired from the receiving section SRx0-k, and supply them to the device to be controlled 2-k, thus intermediating the control of the device to be controlled 2-1 to 2-k by the control device 1. This processing may be replaced with that to supply electric signals supplied by the receiving section SRx0-k to the device to be controlled 2-k directly.

When a signal is found to be addressed to the slave unit S-k for polling, it should be determined whether the signal for polling includes the special code or not. Then, the processor of the control section SP-k makes the transmitting section STx0-k to generate optical signals for a response including information to identify the slave unit S-k. However, when it is found that the signal for polling includes the special code (namely, when the slave unit S-k is the slave unit S-n at the lowest rank), an optical signal including the phase correction request signal is generated, in addition, to request initialization of the phase of clock signals generated by each slave unit at a rank higher than that of the slave unit S-k. The above mentioned optical signal for response may also be generated in a configuration including the phase correction request signal.

When the signal is deemed to be neither the signal to control the device to be controlled 2-k nor being addressed to the slave unit S-k for polling, processing is provided to locate the latched value in the first stack area of the control section SP-k. Then the value located in the first stack area is read when the above mentioned specified timing comes around next time (at the time of start-up of the clock signal, for example), and optical signals with an intensity corresponding to the value read are generated by the transmitting section STx1-k for processing.

The value read by the processor of the control section SP-k from the first stack area is not always the most recent value. The processor of the control section SP-k is required to select the storage location in reading the value from the first stack area so that the time length of pulses constituting optical signals to be generated in the transmitting section STx1-k may be corrected to meet the conditions previously set.

Next, the operation of the optical network system having the above mentioned structure is described with reference to FIGS. 4A to 7N.

FIGS. 4A to 7N are timing charts for explaining operation of each of the master and slave units M, S-1 to S-n.

Each of FIGS. 4A, 5A, 6A and 7A show time sequence of input signal supplied to the control sections MP, SP-1 to SP-n.

Each of FIGS. 4B, 5B, 6B and 7B shows the timing (arrow mark) of start-up (rising edge of the clock) of the clock signals supplied to the control section MP, and SP-1 to SP-n by the clock generating sections MC, and SC-1 to SC-n. In these figures, the arrow marks are replaced with symbols ▲ every five clocks. In this examples, the widths of pulses in the input signal is originally be integer multiples of five of the clock signal cycle of the master unit M. Further, in each five clock signal cycles, ▲ is provided on the second line in the figure Each of FIGS. 4C, 5C, 6C and 7C shows the turning points with ♦ where the logical value (0 or 1) latched in the first stack changes. Each of FIGS. 4D, 5E, 6E and 7E show sequence of input data which were sampled by the control section MP, and/or SP-1 to SP-n of the master and slave units M and S-1 to S-n and which are supplied to the first stack area.

FIGS. 4E, 5F, 6F, and 7F show the time sequence of the first bit in the first stack area. FIGS. 4F, 5G, 6G, and 7G show the time sequence of the second bit in the first stack area. FIGS. 4G, 5H, 6I, and 7I show the time sequence of the third bit in the first stack area. FIGS. 4H, 5J, 6J, and 7K show the time sequence of the fourth bit in the first stack area. FIGS. 4I, 5K, 6K, and 7L show the time sequence of the fifth bit in the first stack area.

FIGS. 4J, 5L, 6L, and 7M show the time sequence of an output signal of the control section MP, and SP-1 to SP-n. FIGS. 4K, 5M, 6M and 7N show the time sequences of output data of the control section MP, and SP-1 to SP-n.

FIGS. 5D, 6D, and 7D show phase deviation of the input signal from the originally designed pulse width.

FIGS. 5I, 6H, 7H, and 7J show correction points at which bit to be read out from the first stack area is changed so as to compensate the phase deviation.

For easier understanding, in these examples, the pulse follows positive logic. Namely, the time length of a successive section with a pulse value of "1" is assumed to be the time length (width) of the pulse. Further, in these examples, the third bit in the five bits of the first stack areas is outputted as the output signal (data) of the control section MP, SP-1 to SP-n in the initial setting and the bit to-be-outputted is shifted from the third bit so as to compensate the phase deviation of the input signal to the control section MP, SP-1 to SP-n.

FIGS. 4A to 4K show the case in which the time length (width) with a pulse value of "1" and that with a pulse value of "0" do not deviate from the original values. The processors of the control sections MP and SP-k check (counts) the number of the same data i.e., successive "1"s or "0"s. In this example, the counted value is either 5 or 10. Therefore, the processors of the control sections MP and SP-k deem that no deviation is generated (detected) in the time length (width) of the pulse. And in this case, the values of the third bit of the first stack area are read out sequentially to be-used for the generation of optical output signals.

FIGS. 5A to 5M show the case in which a value of "0" is latched after latching of a value of "1" for four consecutive times in the first pulse as shown in FIGS. 5A, 5E and 5F. As the continuous sampling of the same data counts for four times, the processors of the controlling sections MP and SP-k detect (determine) that the time length of the pulse has been shortened by one clock signal cycle of the clock signal compared to the original length. In this case, as shown in FIG. 5D, the phase deviation is recognized to be "−1" at a time point when "0" is latched after a value of "1" was continuously latched for four times. And after reading a value of "1" four times continuously at the originally specified storage location (at the third bit) of the first stack area, the storage location (bit) to be-read-out is preceded by one bit to the fourth bit from the original third bit of the first stack area and the value (bit-data) of the fourth bit is read-out to be used for the generation of optical output signals. This corrects the time length with a value of "1" for optical signals to be generated to that for five clock signal cycles. In this example, as the time length to continuously latch a value of "1" or "0" after the first pulse counts for 5 or 10, the phase deviation is not changed from "−1" and maintains the reading of the value of the fourth bit.

FIGS. 6A to 6M show the case in which a value of "0" is latched after the latching of a value of "1" for six consecutive times in the first pulse as shown in FIGS. 6A, 6E, 6F. As the continuous sampling of the same data is counted six times, the processors of the controlling sections MP and SP-k detects that the time length of the pulse has been prolonged by one clock signal cycle compared to the original length. In this case, as shown in FIG. 6D, the phase deviation is recognized to be "+1" at a time point when "0" is latched after latching a value of "1" continuously six times. In this case, after reading a value of "1" five times at the originally specified storage location (the third bit) of the first stack area, the storage location proceeds by one bit to the second bit from the originally specified storage location (the third bit) of the first stack area are read out sequentially to-be-used for the generation of optical output signals. This corrects the time length with a value of "1" for optical signals to be generated to that for five clock signal cycles. In this example, as the time length to continuously latch a value of "1" or "0" after the first pulse counts for 5 or 10, the phase deviation is not changed from "+1" and maintains the reading of the value of the second bit.

FIGS. 7A to 7N show an example in which the change in the phase deviation occurs multiple times. As can be seen from FIGS. 7A and 7D, when the number of continuous sampling is four or nine times, the phase deviation is decreased by 1, while when it is six or eleven times, the phase deviation is increased by 1. Along with these change, the reading locations are changed as shown in FIGS. 7G to 7K. As a result, as shown in FIGS. 7M and 7N, the time length of a value of "1" of the pulse of the optical output signal generated by the control section MP, SP-1 to SP-n becomes integer multiples of five of the clock signal cycle of the master unit M as originally intended.

The processors of the control sections MP and SP-k should minimize the deviation of the storage location from the specified original location to minimize the correction of the pulse time length.

When a value of "0" is latched after latching a value of "1" seven times continuously, the time length of the pulse is corrected to that for five clock signal cycles by deviating the storage location to execute reading from the specified storage location by 2. It is logically possible to correct the time length of pulse to that for ten clock signal cycles by deviating the storage location to execute reading to the preceded storage location by 3. However, such operation is not applied.

When a value of "0" is latched after latching a value of "1" eight times continuously, the time length of the pulse is corrected to that for ten clock signal cycles by deviating the storage location to execute reading from the specified storage location by 2. It is logically possible to correct the time length of pulse to that for five clock signal cycles by deviating the storage location to execute reading to the preceded storage location by 3. However, such operation is not applied.

The processor of the control section SP-k also executes processing, under the control of the program read from the non-volatile memory of the control section SP-k, to gain electrical signals supplied by the receiving section SRx1-k, latch a value shown by the electrical signal, and locate the value in the second stack area of the control section SP-k. In addition, the value located in the second stack area is read at a time point during the next timing, and makes the transmission section STx0-k to emit light with an intensity corresponding to the read value for processing.

However, in the case when the optical signal supplied by the receiving section SRx1-k includes the phase correction request signal, the processor of the control section SP-k being supplied with electrical signals corresponding to the optical signals from the receiving section SRx1-k responds to electric signals corresponding to the phase correction request signal to generate the initialization command and supplies it to the clock generating section SC-k. As a result, the phase of the clock signal generated by the clock generating section SC-k is initialized to be synchronized with the phase of the clock signal generated by the clock generating section SC-n of the slave unit S-n at the lowest rank.

The processor of the control section SP-k selects the storage location to be read from the second stack area so that the time length of a pulse constituting an optical signal to be generated by the transmitting section STx0-k is a value complying with the condition originally scheduled, and the correction of the pulse length is minimized. A method to select the storage location area from the second stack is substantially the same as that to select the storage location from the first stack area as explained above.

As a result of the actions executed, this optical network system transmits optical signals for polling to each slave unit S-1 to S-n when the master unit M has entered an idling state. Each slave unit S-1 to S-n determines whether it itself is the slave unit at the lowest rank or not. If determining that it itself is the unit at the lowest rank, (in the above example, the slave unit S-n determines as such) the relative slave unit initializes to match the phase of the clock signal generated by itself to the phase of the clock signal of the master unit M, and transmits optical signals including phase correction request signals to the other slave units. These slave units initialize their clock signal in response to the phase correction request signal respectively in the same manner above.

For this reason, initialization of the clock signal of each slave unit S-1 to S-n is executed when the master unit M stays in an idling state. Prevention of phase deviation of optical signals to be transmitted and time length deviation of pulses constituting the optical signals are designed not to generate a state hindering communication between the master unit M and each slave unit S-1 to S-n.

In this optical network system, the phase correction request signal indicating initialization of clock signals is issued by the slave unit at the lowest rank. Therefore, the clock signal is initialized only under a favorable communication state such as when the optical signal for polling may reach the slave unit at the lowest rank. In addition, under such a favorable communication state, it is expected that the slave units other than the slave unit at the lowest rank may adequately receive the phase correction request signal. Thanks to this, the clock signal may be initialized correctly leading to adequate prevention of the phase deviation of optical signals to be transmitted and time length deviation of the pulses constituting these optical signals.

In this optical network system, the pulse time length constituting optical signals to be transmitted between the master unit M and each slave unit S-1 to S-n are of a value to match to the conditions originally designed, and operation is executed in a shape that the amount of correction to the pulse time length is at a minimum. This operation also contributes in preventing deviation of the transmitting pulse time length and the phase.

The configuration of this optical network system is not limited to that explained above. For example, the devices to be controlled 2-1 to 2-n may be controlled mutually through the slave units S-1 to S-n. The devices to be controlled 2-1 to 2-n may also control the control device 1 through the master unit M. Further, the slave unit S-k may be that executing the function of the master unit M.

The slave unit S-n may be preconfigured to omit processing to determine whether it itself is the slave unit at the lowest rank or not by assuming that it itself is the unit at the lowest rank without any conditions. While the slave units S-1 to S-(n−1) may be preconfigured to omit processing to determine whether it itself is the slave unit at the lowest rank or not by assuming that it itself is not the unit at the lowest rank without any conditions.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-236093 filed on Aug. 16, 2005 and including specification, claims, drawings and summary. The disclosure of the above Japanese Patent Application is incorporated herein by reference in its entirety.

What is claimed is:

1. An optical network system comprising:
  a master unit that executes the transmitting and receiving of optical signals between itself and other devices through an optical transmission line; and
  slave units each of which executes the transmitting and receiving of optical signals between itself and other devices through an optical transmission line;
  wherein the slave units, from the slave unit at highest rank to the slave unit at lowest rank, are interconnected in the form of a direct chain configuration through an optical transmission line;
  the master unit is connected to the slave unit at the highest rank through an optical transmission line, and executes the transmitting and receiving of optical signals between itself and the slave unit of the highest rank through the optical transmission line, and between itself and the slave unit except the slave unit of the highest rank through other slave unit and the optical transmission line located between the slave unit and itself;
  the master unit determines whether or not a period during which a specified action is not requested to itself has been continued for a certain period of time or longer; and when determined as having been continued, transmits an optical signal for polling including a code requiring a predetermined response to the slave unit at the lowest rank;
  each of the slave units receives optical signal transmitted thereto through the optical transmission line, generates a clock signal, latches a value represented by the optical signal received in response to the clock signal; and generates an optical signal representing latched value;

the slave unit at the lowest rank receives the optical signal for polling including the code, transmits the predetermined response to other slave units through the optical transmission line, the predetermined response requesting initialization of clock signals of the other slave units; and the slave units other than the slave unit at the lowest rank receives the predetermined response, and initialize the clock signals of themselves so as to synchronize with the clock signal generated by the slave unit at the lowest rank.

2. The optical network system according to claim 1, wherein the master unit and each said slave units together comprise an optical network device that executes the transmitting and receiving of optical signals externally through an optical transmission line, comprising:

a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises:

a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;

further comprising first and second transmission sections and first and second receiving sections for the transmitting and receiving section;

wherein the second transmission section of the master unit is connected to the first receiving section of the slave unit at the highest rank; and wherein the first transmitting section of the slave unit at the highest rank is connected to the second receiving section of the master unit.

3. The optical network system according to claim 1, wherein the master unit and each said slave units together comprise an optical network device that executes the transmitting and receiving of optical signals externally through an optical transmission line, comprising:

a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises:

a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;

further comprising first and second transmission sections and first and second receiving sections for the transmitting and receiving section;

wherein the second transmission section of $j^{th}$ slave unit is connected to the first receiving section of $(j+1)^{th}$ slave unit; and wherein the first transmitting section of $(j+1)^{th}$ slave unit is connected to the second receiving section of $j^{th}$ slave unit.

4. The optical network system according to claim 1, wherein wherein the master unit comprises an optical network device that executes the transmitting and receiving of optical signals externally through an optical transmission line, comprising:

a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises:

a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;

further comprising first and second transmission sections and first and second receiving sections for the transmitting and receiving section;

wherein the first transmitting section and the first receiving section are not used but light-shielded; and the slave unit at the lowest rank is the optical network device, and the second transmitting section and the second receiving section are not used but light-shielded.

5. The optical network system according to claim 1, wherein the master unit is connected to an external control device, and each slave unit is connected to an external to-be controlled device.

6. The optical network system according to claim 5,
wherein the master unit is formed inside a chassis commonly used for the control device, or formed in a shape attachable to a slot equipped by the control device.

7. The optical network system according to claim 5,
wherein the slave unit is formed in a chassis used commonly with a to-be-controlled device; or formed in a shape attachable to a slot equipped by the to-be controlled device.

8. The optical network system according to claim 1,
wherein the master unit comprises an optical network device that executes the transmitting and receiving of optical signals externally through an optical transmission line, comprising:
a clock signal generating section for generating clock signals; and
a transmitting and receiving section for receiving optical signals externally, latching a value represented by the optical signal in synchronization with the clock signal, and generating and transmitting the optical signal representing the latched value;
wherein the transmitting and receiving section comprises:
a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and
a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;
wherein the determining section, which determines whether or not a period during which a specified action is not requested to itself has been continued for a certain period of time or longer, makes such a determination based on a clock signal supplied by the clock signal generating section.

9. The optical network system according to claim 1,
wherein the master unit comprises an optical network device that executes the transmitting and receiving of optical signals externally through an optical transmission line,
the optical network device comprises:
a clock signal generating section for generating clock signals; and
a transmitting and receiving section for receiving optical signals externally, latching a value represented by the optical signal in synchronization with the clock signal, and generating and transmitting the optical signal representing the latched value;
the transmitting and receiving section comprises:
a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and
a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;
the optical network device further comprising a control section,
wherein the control section is equipped with a processor including a CPU (Central Processing Unit), a volatile memory including a RAM (Random Access Memory), and a non-volatile memory including a hard disk device,
wherein the master unit is the optical network device; and the non-volatile memory of the control section of the master unit previously stores the data specifying the slave unit at the lowest rank; and the processor of the control section specifies the slave unit at the lowest rank by accessing this data.

10. The optical network system according to claim 1,
wherein the master unit and each said slave units together comprise an optical network device that executes the transmitting and receiving of optical signals externally through an optical transmission line, comprising:
a clock signal generating section for generating clock signals; and
a transmitting and receiving section for receiving optical signals externally, latching a value represented by the optical signal in synchronization with the clock signal, and generating and transmitting the optical signal representing the latched value;
wherein the transmitting and receiving section comprises:
a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and
a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;
further comprising first and second transmission sections and first and second receiving sections for the transmitting and receiving section;
wherein the first and second transmitting section of each slave unit have the same physical composition as that of the first and second transmitting section of the master unit; and
wherein the first and second receiving section of each slave unit have the same physical composition as that of the first and second receiving sections of the master unit.

11. The optical network system according to claim 1,
wherein the master unit and each said slave units together comprise an optical network device that executes the transmitting and receiving of optical signals externally through an optical transmission line, comprising:
a clock signal generating section for generating clock signals; and a transmitting and receiving section for receiving optical signals externally, latching a value represented by the optical signal in synchronization with the clock signal, and generating and transmitting the optical signal representing the latched value;

wherein the transmitting and receiving section comprises:

a determining section for determining, when an optical signal for polling including a special code requesting a specified response, which is addressed to the lowest rank optical network device among multiple optical network devices interconnected mutually through an optical transmission line from the highest rank to the lowest rank is received, whether or not the optical signal for polling is addressed to itself, and a transmitting section for transmitting, when the determining section deems that the optical signal for polling including the special code is addressed to itself, an optical signal representing a correction request requesting an external optical network device to initialize a clock signal of the external optical network device to synchronize it with a clock signal generated by the clock generating section in response to the optical signal for polling;

the optical network device further comprising a control section, wherein the control section is equipped with a processor having CPU (Central Processing Unit), a volatile memory including RAM (Random Access Memory) and non-volatile memory including a hard disk device, wherein the control section of each slave unit has the same physical composition as that of the control section of the master unit.

12. An optical network device that executes the transmitting and receiving of optical signals externally through an optical transmission line, comprising:

a clock signal generating section which generates clock signals; and a transmitting and receiving section which receives optical signals externally, latches a value represented by the optical signal in response to the clock signal, and generates and transmits the optical signal representing latched value;

wherein the transmitting and receiving section includes:

a determining section which determines, when an optical signal for polling including a code requesting a predetermined response, which is addressed to lowest rank optical network device among multiple optical network devices interconnected mutually through an optical transmission line from highest rank to lowest rank, is received, whether or not the optical signal for polling is addressed to itself; and a transmitting section for transmitting, when the determining section determines that the optical signal for polling including the code is addressed thereto, an optical signal representing a correction request requesting at least one external optical network device to initialize a clock signal of the at least one external optical network device to synchronize it with a clock signal generated by the clock generating section thereof.

13. The optical network device according to claim 12, wherein the transmitting and receiving section comprises a section for initializing the clock signal generated by the clock signal generating section to synchronize it with the clock signal generated by an external optical network device in response to the correction request upon receiving the optical signal representing the correction request.

14. The optical network device according to claim 12, wherein the transmitting and receiving section stores latched values sequentially, selects stored values sequentially, and generates optical signals representing the selected values; and the stored values are selected so that the time length of the pulse constituting the optical signal to be generated is a value conforming to specified conditions; and the correction amount of the pulse length from the time length of the pulse constituting the optical signal received is minimized.

15. The optical network device according to claim 12, wherein the transmitting and receiving section comprises a first transmission section for transmitting the optical signal to the optical network device at upper rank, a second transmission section for transmitting the optical signal to the optical network device at lower rank, a first receiving section for receiving optical signal from the optical network device at upper rank, and a second receiving section for receiving the optical signal from the optical network device at lower rank, resulting in mutual transmission in the optical network.

16. The optical network device according to claim 12, wherein the clock signal generating section comprises a crystal oscillator and/or a logic circuit.

17. The optical network device according to claim 12, comprising:

a control section, wherein the control section is equipped with a processor including a CPU (Central Processing Unit), a volatile memory including a RAM (Random Access Memory), and a non-volatile memory including a hard disk device.

18. The optical network device according to claim 17, wherein the processor of the control section reads the program stored in the non-volatile memory of the control section, and executes this program using the clock signal supplied by the clock generating section as an operating clock.

19. An optical network control method for controlling an optical network system comprising: a master unit that executes the transmitting and receiving of optical signals between itself and other devices through an optical transmission line; and one or more slave units each of which executes the transmitting and receiving of optical signals between itself and other devices through an optical transmission line;

wherein the slave units, from the slave unit at the highest rank to the slave unit at the lowest rank are interconnected in the form of a direct chain configuration through an optical transmission line;

the master unit is connected to the slave unit at the highest rank through an optical transmission line, and executes the transmitting and receiving of optical signals between the slave units and itself through other slave units an optical transmission line located between itself and other slave units;

the master unit determines whether or not a period during which a specified action is not requested to itself has been continued for a certain time or longer; and when it is deemed as having been, transmits an optical signal for polling including a special code requiring a specified response to the slave unit at the lowest rank;

each of the slave units generates a clock signal, and latches a value represented by the optical signal received by itself at a timing to synchronize with the clock signal generated by itself; and generates an optical signal representing the latched value;

the slave unit at the lowest rank responds to a special code when it receives the optical signal for polling including the special code; and transmits an optical signal to the other slave units, the optical signal representing a correction request requesting the initialization of clock signals generated by the other slave units; and the slave units other than that at the lowest rank respond to the correction request when they receive the optical signal representing the correction request; and initialize clock signals generated by themselves to synchronize them with the clock signal generated by the slave unit at the lowest rank.

20. A method for controlling an optical network device that executes the transmitting and receiving of optical signals externally through an optical transmission line, the method controlling the optical network device to execute;

a clock signal generating step to generate clock signals; and a transmitting and receiving step to receive an optical signal externally, latch the value represented by the optical signal in synchronization with the clock signal, and generate and transmit the optical signal representing the latched value;

wherein the transmitting and receiving step comprises:

a determining step to determine, when an optical signal for polling including a code requesting a specified response, which is addressed to lowest rank network device among multiple optical network devices interconnected mutually through an optical transmission line from highest rank to lowest rank, is received, whether or not the optical signal for polling is addressed thereto; and a transmitting step to transmit, when the determining step determines that the optical signal for polling including the special code is addressed thereto, the specified response requesting an external optical network device to synchronize a clock signal of the external optical network device to a clock signal generated by the clock generating step.

* * * * *